Dec. 25, 1956 E. J. TOMCAVAGE ET AL 2,775,672

COAXIAL CABLE TEMPERATURE SIGNAL STRENGTH CONTROL

Filed April 16, 1954 2 Sheets-Sheet 1

INVENTORS
JOHN WALSONAVICH,
EDWARD J. TOMCAVAGE,
BY

McMorrow, Berman & Davidson
ATTORNEYS.

COAXIAL CABLE TEMPERATURE SIGNAL STRENGTH CONTROL

Filed April 16, 1954 2 Sheets-Sheet 2

INVENTORS
JOHN WALSONAVICH,
EDWARD J. TOMCAVAGE,
BY
McMorrow, Berman & Davidson
ATTORNEYS United States Patent Office 2,775,672

Patented Dec. 25, 1956

2,775,672

COAXIAL CABLE TEMPERATURE SIGNAL STRENGTH CONTROL

Edward J. Tomcavage and John Walsanavich, Mahanoy City, Pa.

Application April 16, 1954, Serial No. 423,792

4 Claims. (Cl. 201—48)

This invention relates to high frequency transmission lines, and more particularly to an improved temperature controlled transmission system particularly suitable for use in community television receiving systems.

A main object of the invention is to provide a novel and improved high frequency transmission system which is provided with means for compensating for the variation in signal attenuation of the transmission line with changes in temperature, the improved system involving relatively simple components, being automatic in operation, and being arranged to provide a controlled signal level in the transmission line over a wide range of temperature changes.

A further object of the invention is to provide an improved transmission system for high frequency signals, such as for transmitting television signals from an antenna to a television receiver distribution point, such as in rural areas located at a considerable distance from the nearest television transmitter, the improved system involving inexpensive components, being reliable in operation, and being easy to maintain in proper working order.

Further objects and advantages of the invention will become apparent from the following description and claims, and from the accompanying drawings, wherein:

Figure 4:
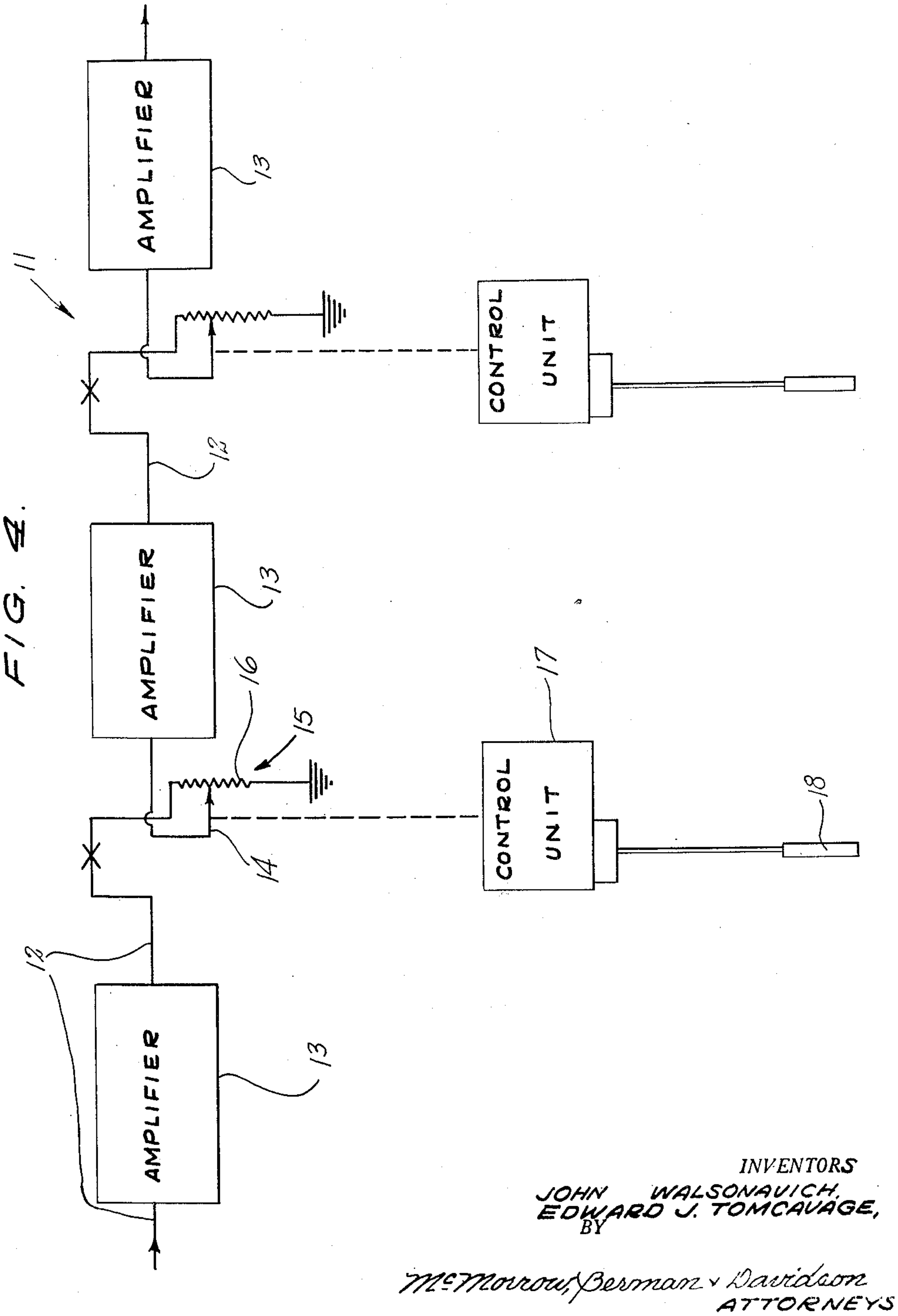
Figure 4 is a schematic block diagram illustrating a plurality of successive amplifier units arranged between successive sections of a transmission line and provided with temperature-responsive signal input level control units according to the present invention.

Referring to the drawings, and more particularly to Figure 4, 11 generally designates an improved high frequency transmission system according to the present invention, suitable for use in transmitting high frequency signals, such as a television signal from an antenna, which may be located in an elevated position, to a distribution center for a community television receiver system, which may be located at a considerable distance from the antenna. For example, the antenna may be located on a mountain top, or similar elevated location, and the community to be supplied with the television signals may be located in a valley or relatively low area situated a number of miles from the receiving antenna.

The transmission system 11 comprises a plurality of successive sections of coaxial line, such as the transmission line sections 12, between which are connected the respective broad band amplifiers 13. The amplifiers 13 are employed to compensate for the normal attenuation in the transmission line sections, and are arranged to boost the signal level at the end of each transmission line section 12 to a sufficient value to compensate for the attenuation in the preceding transmission line section.

The amount of attenuation which occurs in the transmission line sections varies with temperature, whereby the performance of the transmission line fluctuates with temperature changes, producing undesired instability, and causing a wide variation in the signal to noise ratio for the television signal transmitted to the line under varying temperature conditions. Ordinarily, the amplifiers employed between successive sections of a coaxial transmission line employed for the purpose contemplated by the present invention are fixed in adjustment, and require manual readjustment in order to compensate for any changes in the attenuation in the transmission line sections to which it is connected. Obviously, the overall gain in the transmission system can be controlled by suitably adjusting the respective amplifiers 13, but since these amplifiers are physically widely separated, it is ordinarily quite inconvenient to adjust the amplifiers when a sufficient change in temperature occurs to substantially alter the attenuation characteristics of the line sections.

It is the primary purpose of the present invention to provide a means for automatically adjusting the signal input levels to the respective amplifiers 13 in accordance with changes in ambient temperature at the respective amplifiers, to thereby compensate for the changes in the attenuation of the associated transmission line sections.

As will be seen from Figure 4, the respective amplifiers have their input circuits connected to sliding taps 14 of respective potentiometers 15, said potentiometers having their resistance windings 16 connected as terminations of the respective preceding transmission line sections 12. Thus, each sliding tap 14 is connected to the input grid of the amplifier 13 associated with the next transmission line section 12, the signal input level for said amplifier being controlled by the position of the sliding tap 14 of the potentiometer 15. Thus, the compensation for attenuation in the preceding transmission line section 12 can be made by adjusting the sliding tap 14 of the potentiometer terminating the transmission line section.

In accordance with the present invention, the sliding tap 14 of each potentiometer 15 is moved in accordance with changes in temperature, as by the provision of a control unit 17 located near the associated amplifier 13 and being provided with a temperature responsive element 18 which is exposed to ambient temperature. The sliding tap 14 of the associated potentiometer 15 is operated in any suitable manner by the control unit 17, as by the provision of a suitable mechanical linkage between the sliding tap and the temperature responsive device in the control unit 17 which is actuated by the temperature sensitive element 18.

Figures 1, 2, 3:
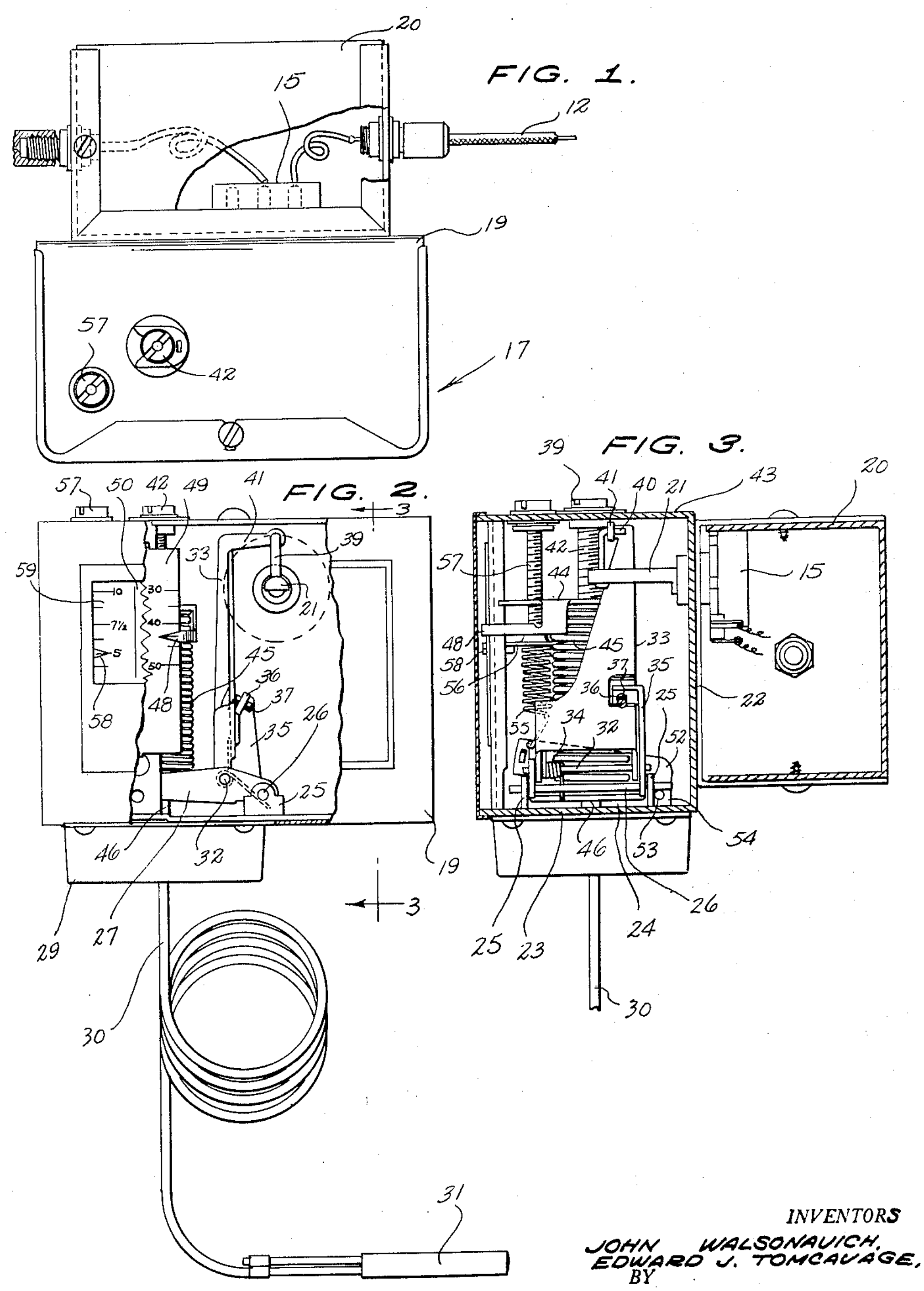
Figure 1 is a side elevational view of an amplifier input signal level control unit employed in the improved transmission system of the present invention.
Figure 2 is a top plan view, partly broken away, of the signal level control unit illustrated in Figure 1.
Figure 3 is a transverse vertical cross sectional view taken on the line 3—3 of Figure 2.

Referring to Figures 1 to 3, a typical embodiment of a suitable control unit 17 is illustrated, said control unit comprising a main housing to which is secured a sub-housing 20. Mounted in the sub-housing 20 is the potentiometer 15, the sliding tap of the potentiometer being secured to an operating shaft 21 in the conventional manner, said shaft 21 extending into the main housing 19, as shown in Figure 3, and the potentiometer 15 being secured by being suitably mounted in the wall 22 between the main housing and the sub-housing. Mounted on a wall 23 of the main housing 19 is a U-shaped bracket 24 having the parallel apertured lugs 25, 25 in which is secured the pivot shaft 26. Designated at 27 is a generally channel-shaped arm having one end thereof received between the lugs 25, 25 and receiving the pivot shaft 26 through its flanges at said one end, whereby the arm 27 is pivoted to the lugs 25 for rotation around the pin or shaft 26. Designated at 29 is a conventional bellows unit which is secured to the wall 23 of the main housing 19 and which is provided with a pin member 46 extending slidably through said wall and bearing on the bottom surface of the lever arm 27. Mounted on the arm 27 is a coiled spring 45, said coiled spring being substantially axially aligned with the bellows pin 46 and bearing downwardly on the arm under the pressure exerted on its top end by a plate member 44, presently to be described. Connected to the bellows unit 29 is a flexible conduit 30, such as a flexible metal conduit, to the end of which is connected a gas filled chamber 31 which is exposed to ambient temperature. Thus, changes in temperature cause the bellows unit 29 to expand or contract, causing the pin element 46 to move and thus causing the arm 27 to be moved accordingly, since said arm is held against the pin element 46 by the spring 45.

Designated at 32 is a transverse pin member which extends through the intermediate marginal upper portions of the flanges of the arm 27 and on which is pivotally mounted the upstanding lever member 33, said lever member 33 being also generally channel-shaped and being biased clockwise, as viewed in Figure 2, by a coiled spring 34 mounted on the transverse pin 32. As shown, one end of the pin 32 is anchored beneath the pivot shaft 26 and the other end of said spring 34 bears against the web of the lever member 33, biasing said lever member clockwise, as viewed in Figure 2. The arm 27 is formed at the end of one of its flanges with an upstanding lug 35 of substantial length formed at its top end with a tab 36 through which is threaded an adjustable stop screw 37 against which the lever member 33 abuts and which thus limits the clockwise rotation of said lever member 33, as viewed in Figure 2.

Rigidly secured to the end of the potentiometer shaft 21 is an outwardly projecting arm 39 having a rightangled projection 40 at its end, said projection pivotally engaging in an aperture formed in the end of a finger 41. Finger 41 is integrally formed with the lever member 33 and extends substantially at right angles to the main body of said lever member, as shown in Figure 2. Thus, rotation of the lever member 33 will be transmitted to the potentiometer shaft 21 by the finger 41 and the arm 39 pivotally connected to said finger.

Designated at 42 is an adjustable stop screw which is rotatably mounted in the wall 43 of main housing 19 opposite the wall 23 of said housing, the stop screw 42 being axially aligned with the bellows 29 and being threadedly engaged through the indicator plate 44 which bears on the top end of the spring 45. Since the lower end of the spring 45 bears on the arm 27, the spring pressure on the arm 27, and consequently on the diaphragm pin 46 of the bellows can be adjusted by adjusting the screw 42. The plate member 44 is formed with a pointer element 48 which extends adjacent to a scale 49 mounted in the housing 19 adjacent a transparent window 50 provided in the housing wall through which the pointer 48 and scale 49 may be observed.

A lever member 52 is pivoted at 53 to an upstanding lug 54 secured to the housing wall 23, said lever extending transversely of the arm 27 and being pivotally and slidably engaged with the end thereof. Connected to the end of the transverse lever 52 is one end of a coiled spring 55, the other end of said spring 55 being secured to an indicator plate 56 which threadedly receives an adjusting screw 57. The adjusting screw 57 is rotatably mounted in the wall 43 of the main housing adjacent the adjusting screw 42. The plate member 56 is formed with an indicator element 58 which extends adjacent a differential scale 59 provided adjacent the scale 49 and visible through the window 50.

The bellows unit, per se, and the temperature differential adjusting means therefor, are conventional in construction and are employed in the "Ranco" type O temperature responsive switch unit manufactured by Ranco Inc., Columbus, Ohio.

The differential adjusting screw 57 is employed to establish a desired differential temperature value which must be exceeded before the setting of the potentiometer 15 will be changed. The screw 42 is employed to set the indicator 48 and the plate member 44 at a predetermined nominal temperature value, corresponding to a normal ambient temperature, at which the potentiometer 15 will be at a normal setting. When the temperature varies from the aforesaid normal value, indicated on the scale 49 by the indicator 48, and when the predetermined differential is exceeded, the bellows 29 will cause the arm 27 to be rotated, the rotation of the arm 27 being transmitted directly to the lug 35, and causing the lever 33 to be rotated, since said lever is biased into contact with the stop screw 37 carried by lug 35. Thus, when a change in temperature occurs beyond the differential value indicated on the scale 59, the setting of the sliding tap 14 of potentiometer 15 will be changed to thereby vary the input signal level of the amplifier 13 to which sliding tap 14 is connected, the change in signal level being in accordance with the change in the attenuation of the preceding transmission line section 12 and being of a value to maintain a substantially constant over-all signal attenuation along the transmission line system.

While a specific embodiment of an improved transmission system for high frequency signals has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A temperature-responsive signal level control device for use in a high frequency transmission system to control the signal input level of an amplifier of said system comprising a main housing, a bellows mounted in said main housing, a temperature sensing element connected to said bellows and arranged to expand and contract said bellows in accordance with changes in ambient temperature, a sub-housing mounted on said main housing, respective coaxial cable connectors mounted on the walls of said sub-housing for receiving terminal portions of the transmission system, a potentiometer mounted in said sub-housing and having a rotary control shaft extending into said main housing through a wall thereof, means electrically connecting respective terminals of said potentiometer to said coaxial cable connectors, whereby one terminal of the potentiometer may be connected to a section of the transmission system and another terminal of the potentiometer may be connected to the input terminal of an amplifier, a lever pivoted in said main housing and operatively connected to said bellows, and link means connecting the intermediate portion of said lever to said control shaft.

2. A temperature-responsive signal level control device for use in a high frequency transmission system to control the signal input level of an amplifier of said system comprising a main housing, a bellows mounted in said main housing, a temperature sensing element connected to said bellows and arranged to expand and contract said bellows in accordance with changes in ambient temperature, a sub-housing mounted on said main housing, respective coaxial cable connectors mounted on the walls of said sub-housing for receiving terminal portions of the transmission system, a potentiometer mounted in said sub-housing and having a rotary control shaft extending into said main housing through a wall thereof, means electrically connecting respective terminals of said potentiometer to said coaxial cable connectors, whereby one terminal of the potentiometer may be connected to a section of the transmission system and another terminal of the potentiometer may be connected to the input terminal of an amplifier, an arm pivotally mounted in said main housing, means operatively connecting said bellows to one end of said arm, a link member pivoted at one end to the intermediate portion of said arm and connected at its other end to said control shaft, an abutment element on said arm, and spring means biasing said link member against said abutment element, whereby said abutment element causes said control shaft to be rotated responsive to rotation of said arm by said bellows.

3. A temperature-responsive signal level control device for use in a high frequency transmission system to control the signal input level of an amplifier of said system comprising a main housing, a bellows mounted in said main housing, a temperature sensing element connected to said bellows and arranged to expand and contract said bellows in accordance with changes in ambient temperature, a sub-housing mounted on said main housing, respective coaxial cable connectors mounted on the walls of said sub-housing for receiving terminal portions of the transmission system, a potentiometer mounted in said sub-housing and having a rotary control shaft extending into said main housing through a wall thereof, means electrically connecting respective terminals of said potentiometer to said coaxial cable connectors, whereby one terminal of the potentiometer may be connected to a section of the transmission system and another terminal of the potentiometer may be connected to the input terminal of an amplifier, an arm pivotally mounted in said main housing, means operatively connecting said bellows to one end of said arm, a link member pivoted at one end to the intermediate portion of said arm, a projection on said operating shaft pivotally connected to the other end of said link member, an abutment element on said arm located on the side of said link member opposite the bellows, and spring means biasing said link member against said abutment element, whereby said abutment element causes said control shaft to be rotated responsive to rotation of said arm by said bellows.

4. A temperature-responsive signal level control device for use in a high frequency transmission system to control the signal input level of an amplifier of said system comprising a main housing, a bellows mounted in said main housing, a temperature sensing element connected to said bellows and arranged to expand and contract said bellows in accordance with changes in ambient temperature, a sub-housing mounted on said main housing, respective coaxial cable connectors mounted on the walls of said sub-housing for receiving terminal portions of the transmission system, a potentiometer mounted in said sub-housing and having a rotary control shaft extending into said main housing through a wall thereof, means electrically connecting respective terminals of said potentiometer to said coaxial cable connectors, whereby one terminal of the potentiometer may be connected to a section of the transmission system and the other terminal of the potentiometer may be connected to the input terminal of an amplifier, an arm pivotally mounted in said main housing, means operatively connecting said bellows to one end of said arm, a link member pivoted at one end to the intermediate portion of said arm, a projection on said operating shaft pivotally connected to the other end of said link member, an abutment element on said arm located on the side of said link member opposite the bellows, and spring means biasing said link member against said abutment element, whereby said abutment element causes said control shaft to be rotated responsive to rotation of said arm by said bellows.

References Cited in the file of this patent

UNITED STATES PATENTS 1,561,892 Whiting ---------------- Nov. 17, 1925

FOREIGN PATENTS 959,473 France ----------------- Oct. 3, 1949